Oct. 31, 1950   J. F. COOK   2,527,917
HEAT REGULATOR APPARATUS
Filed June 12, 1947   2 Sheets-Sheet 1

INVENTOR.
John F. Cook
BY
Andrew F. C. Vinterson
atty.

Oct. 31, 1950 J. F. COOK 2,527,917
HEAT REGULATOR APPARATUS
Filed June 12, 1947 2 Sheets-Sheet 2

INVENTOR.
John F. Cook

Patented Oct. 31, 1950

2,527,917

UNITED STATES PATENT OFFICE 2,527,917

HEAT REGULATOR APPARATUS

John F. Cook, Rockford, Ill.

Application June 12, 1947, Serial No. 754,299

12 Claims. (Cl. 236—9)

This invention relates to heat regulator apparatus designed to provide protection from a furnace overheating dangerously in the event the operator at the time of "firing" moves the control switch to a position to open the draft so as to avoid smoking and then absent-mindedly or carelessly leaves the control switch in the wrong position, many serious fires in homes having been traceable to this cause despite such safeguards of a more or less makeshift type that have been available in the past.

The principal object of my invention is to provide in conjunction with a furnace draft regulator:

(1) A limit switch for limiting the temperature of the bonnet or plenum chamber even though the room thermostat may still call for heat;

(2) A circuit for a manually operated switch to cause the furnace draft to be opened when desired even though the temperature limit for the bonnet has been reached or exceeded and/or the room thermostat is not calling for heat, and (3) A safe high temperature limit switch to limit the temperature of the bonnet to within safe limits even though the manually operated switch for causing the furnace draft to be opened has been operated to open the draft.

Figure 1:
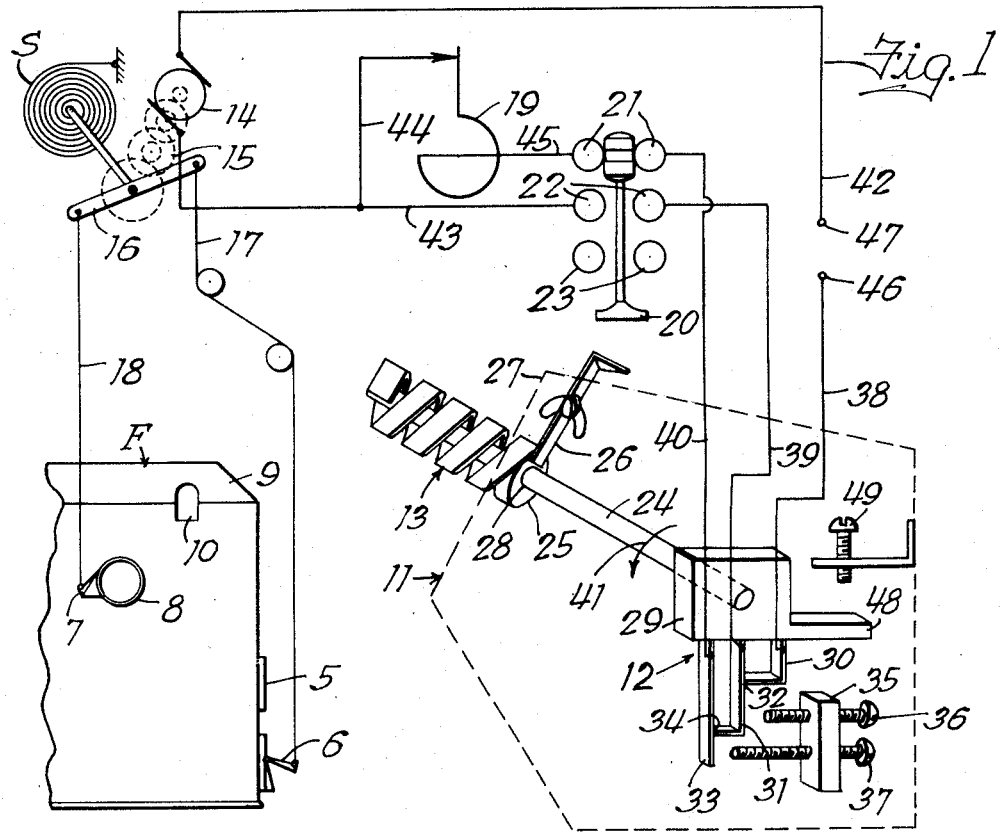
Figure 2:
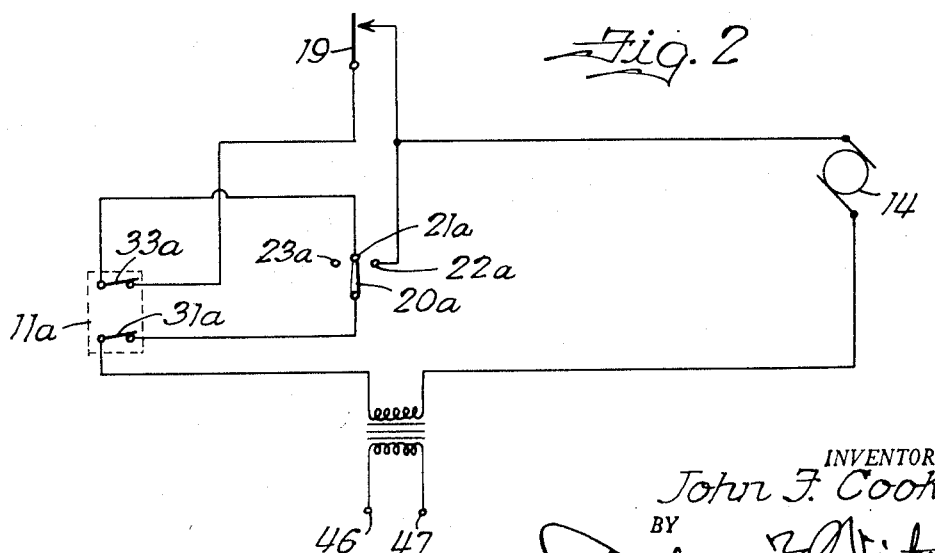
Figure 3:
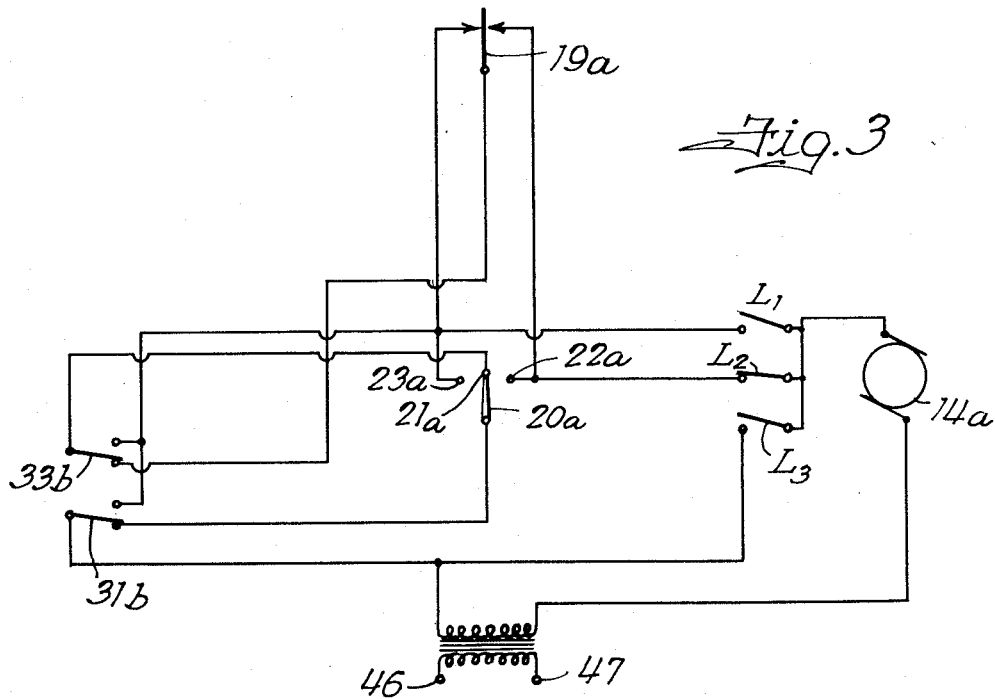
Figure 4:
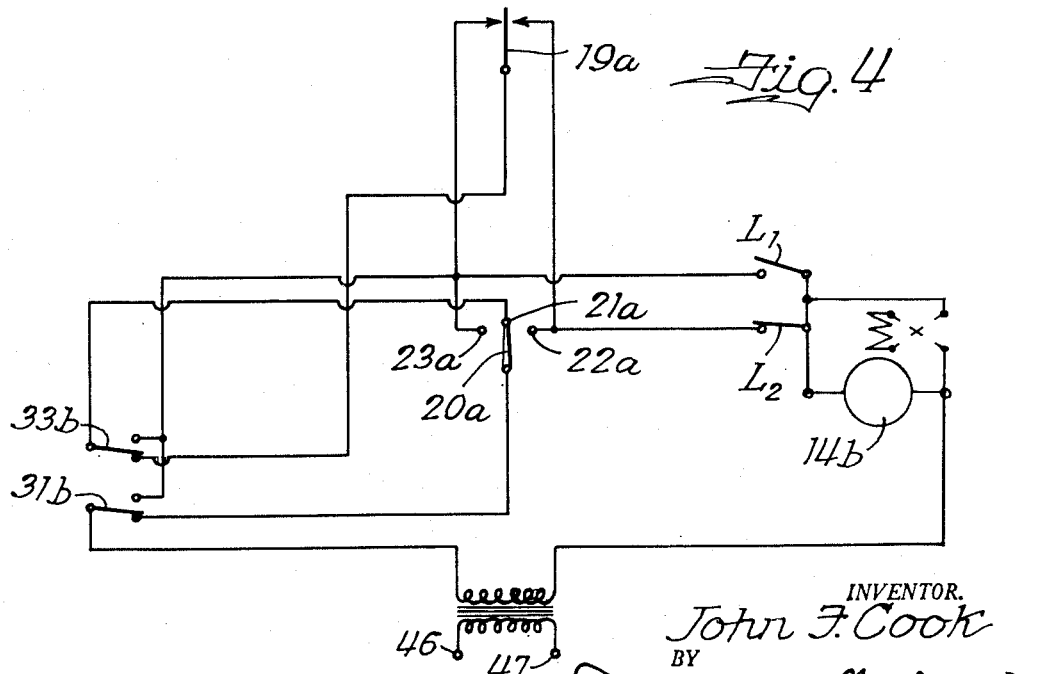

In the accompanying drawings illustrating the invention:

Fig. 1 is a general view of a heating system embodying the improved heat regulator apparatus of my invention, and indicating diagrammatically the mechanical operation of the draft and check, and showing also the electrical wiring diagram for the apparatus of my invention, namely, the limit switch and manually operated switch, and Figs. 2, 3 and 4 are wiring diagrams showing three other circuits adapted to accomplish the same purposes.

Similar reference numerals are applied to corresponding parts throughout these views.

Referring first to Fig. 1 the reference letter F designates a furnace in which the fire door is indicated at 5, 6 is the hinged draft regulating member, and 7 the hinged check member on the usual smoke pipe 8. The bonnet 9 has an opening provided therein, as indicated at 10, for the unit 11 of my invention, the latter housing the limit switch 12 and its operating thermostat 13 in the form of a spiral bi-metal warp element that is disposed inside and responds to the temperature of the bonnet or plenum chamber 9. The electric motor 14 is of a stall type and has as part of its function the winding up of a spring S or otherwise storing up potential energy in such a manner that if the motor is rendered inoperative by reason of power failure or by the opening of a switch or switches in its electrical circuit, the energy stored in the spring S will serve to restore the motor 14 to its starting position. The motor 14 operates, through reduction gearing 15, a rocker arm 16, one end of which is connected as indicated at 17 to the draft 6, and the other end as indicated at 18 to the check 7. Thus, when the room thermostat 19 calls for heat and closes the circuit to the motor 14, the latter will open the draft 6 and close the check 7, assuming, of course, that the manual switch element 20 is in the position shown, closing contacts 21. There is another set of contacts 22 with which the switch element 20 may be engaged when not pulled out all the way to engage the dummy contacts 23, these contacts 22 being engaged when the operator pulls switch element 20 outwardly preparatory to "firing," in order to open the draft and avoid smoking. When no draft is desired, as when shutting the furnace off, the switch 20 is pulled out to engage contacts 23.

In operation, assuming the thermostat 19 calls for heat and closes the circuit for motor 14, the motor operates to open the draft 6 and close the check 7. The motor, in this operation, also winds spring S. The warp element 13 disposed in the bonnet 9 is heated and when it attains a predetermined temperature turns the shaft 24 far enough to operate the limit switch 12 to break the circuit for the motor 14 in a manner which will later appear, whereupon the spring S will restore the motor 14, draft 6 and check 7 to their initial position with the draft closed and the check open. The warp element 13, as clearly appears in Fig. 1 has one end secured to a bearing 25 which is rigidly supported by an arm 26 rotatably adjustably secured to the wall of the housing or frame 27 of the unit 11, as indicated by the clamping bolt and arcuate slot provided therefor in the wall of said housing or frame. The other end of the warp element is secured to the shaft 24 which extends through a bearing hole 28 in the bearing 25 with a free working fit. Now, at the time of "firing," the operator can, in order to avoid smoking, open the draft and close the check independently of the room thermostat 19, by pulling out the switch element 20 into engagement with contacts 22, whereupon the motor 14 opens the draft 6 and closes the check 7. He can do this without fear of causing dangerous overheating of the furnace in the event he should happen to forget to throw the switch element 20 back to its normal position, because there can occur only a predetermined safe rise in temperature in the bonnet 9, due to the fact that, as will soon appear, the circuit for the motor 14 is broken at a pre-selected higher bonnet temperature. When the circuit for the motor 14 is broken, the spring S, as previously described, returns the motor to its initial position closing the draft 6 and opening the check 7. In other words, with my improved control means, the temperature in the bonnet 9 is definitely controlled to prevent overheating in the event the draft is left open accidentally, by causing the system to cycle at a pre-selected higher temperature limit. The adjustability of the thermostat 13 with arm 26 also assures comfortable heating under all weather conditions, because higher allowable bonnet temperatures are obtainable by merely adjusting the arm 26 clockwise, and vice versa. Then, too, in coldest weather or under special circumstances when the house may not heat comfortably with room thermostat control, the operator may throw the switch element 20 onto contacts 22 for increased heat output, independent of the room thermostat.

The limit switch 12 comprises a body 29 of insulation material suitably fixed on the end of the shaft 24 to turn therewith and carrying two L-shaped leaf spring contacts 30 and 31 that are normally disposed in abutment at 32, and a straight leaf spring contact 33 that is normally in abutment with contact 31 at 34. A stationary support 35 mounted in but insulated from the housing or frame 27 of the unit 11 adjacent the switch 12 carries adjustable screw abutments 36 and 37 for cooperation with the contacts 31 and 33 in such a way that, assuming conductors 38, 39 and 40 are electrically connected with contacts 30, 31 and 33, respectively, the circuit between conductors 39 and 40 will be broken upon rotation of shaft 24 in the direction of arrow 41 through a predetermined angularity, the break in the circuit being due to separation of contacts 31 and 33 by reason of abutment of contact 33 with screw 37 when the shaft 24 has been turned through a further predetermined angularity in the same direction, the circuit through conductors 38 and 39 will be broken by reason of abutment of contact 31 with screw 36. The conductor 38 is one of two line conductors, the other of which 42 is connected directly with motor 14. Conductor 39 extends to one of the contacts 22, the other contact being connected with the other side of the motor 14 by another conductor 43. Conductor 43 is connected, as at 44, with the stationary but usually adjustable contact of the room thermostat 19. The latter is connected, as shown at 45, to one of the contacts 21, the other contact 21 being connected to conductor 40.

In operation, when switch 20 is in the normal position illustrated closing contacts 21 and the room thermostat 19 calls for heat, the circuit through the motor 14 is completed at the room thermostat as follows: From line terminal 46 through conductor 38 and contacts 30, 31 and 33 to conductor 40, and through contacts 21 of switch 20 to thermostat 19, and thence through conductors 44 and 43 to motor 14, and from motor 14 through conductor 42 to the other line terminal 47. The motor runs and causes the draft 6 to be opened and the check 7 to be closed, meanwhile winding up spring S. The furnace is, therefore, set for increased delivery of heat and ultimately the temperature in the bonnet 9 rises, whereupon the thermostat warp element 13 distorts in response to the rise in temperature and gradually turns the shaft 24 in a counterclockwise direction. When a predetermined temperature is reached, there is sufficient warpage of the thermostatic element 13 to break the circuit at 34 by reason of flexing of contact 33 by engagement with screw 37. As soon as this occurs, the spring S which was previously loaded by the motor 14, restores the motor 14 and draft 6 and check 7 to their initial position with the draft 6 closed and the check 7 open. It is, of course, entirely possible that the room thermostat 19 may be heated up sufficiently to break the circuit before the temperature in the bonnet 9 rises enough to break the circuit at 34. However, if the manual switch element 20 is placed in a position closing contacts 22, as when "firing," and is left in that position, unintentionally, or otherwise, it will be obvious that the room thermostat 19 is shunted and can no longer participate in the control of the motor circuit and that the contact 33 is also rendered inoperative. When switch element 20 closes contacts 22, the circuit for the motor 14 is completed as follows: From terminal 46 through conductor 38 and contacts 30 and 31 to conductor 39, and thence through contacts 22 and conductor 43 to motor 14, and thence through conductor 42 to the other line terminal 47. Under these conditions, the furnace can build up to a higher bonnet temperature before the motor circuit will be broken and the draft 6 closed and check 7 opened, because the circuit is not affected by the breaking of contacts 31 and 33 at 34 by reason of flexing of contact 33 by engagement with screw 37, but will be broken only when the contact 31 is flexed by engagement with screw 36 and the circuit between contacts 30 and 31 is broken at 32. It will be seen that adjustment of the screws 36 and 37 determine the differential between the bonnet temperature at which contact is broken at 34 and the bonnet temperature at which contact is broken at 32. 34 is identified with control by the room thermostat 19; 32 with control divorced from the room thermostat. If the operator inadvertently leaves the switch element 20 in the position closing contacts 22, the system will continue to cycle at the higher temperature limit until the fuel thrown into the fire is used up. Adjustment of the thermostat 13 in one direction steps up or down the critical bonnet temperatures, without disturbing the differential established by the adjustment of the screws 36 and 37, and vice versa. In passing, attention is called to the arm 48 on the body 29 which is arranged to strike an adjustable limit screw 49, whereby positively to limit counterclockwise rotation of the shaft 24 after the leaf springs 31 and 33 have been deflected by engagement with screws 36 and 37 for automatic control purposes, as above described, whereby to prevent excessive and even ruinous deflection of the leaf springs. After the movement of the shaft is limited in this way any further distortion of the thermostat 13 is absorbed in the thermostat itself and it has sufficient resilience so that no harm is done.

Three other circuits for accomplishing the same purpose are shown in Figs. 2, 3 and 4.

The circuit shown in Fig. 2 permits the use of a single-pole, three-position, manual selector switch 20a, and, as further indicated in this diagram, two separate thermostatic switches 31a and 33a are provided in a unit 11a adapted to be fitted in the hole 10 in the bonnet 9 of the furnace F, each of these thermostatic switches being of any suitable or preferred construction, the switch 31a, for example, corresponding to the switch 12 minus contact 33 and screw 37 for the high temperature limit in the bonnet, and the switch 33a, for example, corresponding to switch 12 minus contact 30 and screw 36 for the low temperature limit in the bonnet. The operation of this apparatus is substantially the same as that previously described: When the switch 20a engages contact 21a and the room thermostat 19 calls for heat, the motor 14 opens draft 6 and closes check 7, and the motor circuit will not be broken until either the room thermostat 19 is satisfied, or the temperature in the bonnet 9 causes the switch 33a to open. When switch 20a is shifted to contact 22a, as when "firing," the room thermostat 19 is shunted and safe operation is assured even if the operator forgets to throw the switch 20a back to contact 21a because as soon as the temperature in the bonnet 9 reaches a predetermined higher limit for which the thermostatic switch 31a is set, the switch opens and the circuit for the motor 14 is broken and the draft 6 is closed and the check 7 is opened automatically, and such operation will be continued either until the fuel is used up or the operator returns the switch 20a to the normal position shown, engaging contact 21a.

The circuit shown in Fig. 3 is for use in a three-wire system employing a regulator motor 14a that is electrically driven both to open and to close the draft, this motor being of a unidirectional type having limit switches L1—L3 to stop the final drive at 180° intervals of movement of the crank element or elements operating the draft and check, so as always to leave the draft in open or closed position automatically. In this circuit, it is necessary to use two separate temperature operated single-pole, double-throw switches 31b and 33b in place of the single dual-limit switch 12, because upon reaching the limit temperature for which they are set, they must not only break the draft opening circuit, but must establish the draft closing circuit. Of course, this circuit and this type of regulator motor depend entirely on electrical power and the operation is therefore not as safe and fool-proof as in the circuits of Figs. 1 and 2, because the draft will not be closed in the event power failure occurs while the draft is open. The same single-pole, three-position manual selector switch 20a is usable in this circuit as in Fig. 2, but the room thermostat, as indicated at 19a, is of a single-pole, double-throw type to open the draft automatically when calling for heat and close the draft when the desired room temperature has been reached.

Fig. 4 shows a reversible electric motor 14b in a circuit which is otherwise generally the same as that of Fig. 3. The operation of this form is, of course, closely similar to that of Fig. 3.

The invention, although described as applied to hot air heating systems, is applicable also to steam and hot water heating systems by merely subjecting the thermostat 13 to steam and water temperatures. Also, while I have shown a hot air heating system controlled, at least partially, by a room thermostat 19, it is possible to do without that and use only the bonnet temperature control, as was indicated at one point in the description, the arm 26 being shifted as outdoor temperatures dictated whereby to supply enough heat approximately to balance the heat loss of the building. It should also be understood that my invention is not limited to use with interconnected check and draft, but is also applicable to installations having a damper in the smoke pipe.

It is believed the foregoing description conveys a good understanding of the objects and advantages of my invention. The appended claims have been drawn to cover all legitimate modifications and adaptations.

I claim:

1. In a heat regulator system comprising a heater having a chamber the temperature in which should not exceed a predetermined safety limit and an openable and closable draft control member, an electric motor connected to open and close said draft, and a room thermostat switch electrically connected with said motor and a source of electric current supply to control the operation of the motor in response to temperature change and heat demand in the room, the combination with said motor and said room thermostat switch of a thermostatically operable limit switch means including two sets of contacts, one operable thermostatically at a lower critical temperature than the other, the thermostat of which limit switch means is responsive to temperature change in the heater chamber, and a manually operable, plural position selector switch which is electrically connected with said room thermostat switch, said limit switch means, motor, and current source and is arranged in one setting of said selector switch to connect the room thermostat switch and the lower temperature contacts of said limit switch means in series in said motor circuit to control the operation of said motor thermostatically by means of said room thermostat switch and limit switch means jointly, but is arranged in another setting of said selector switch to shunt the room thermostat switch leaving only the higher temperature contacts of said limit switch means in series in the motor circuit to control the operation of the motor thermostatically with said limit switch means alone.

2. In a heat regulator system comprising a heater having a chamber the temperature in which should not exceed a predetermined safety limit and an openable and closable draft control member, an electric motor connected to open and close said draft, a room thermostat switch electrically connected with said motor and a source of electric current supply to control the operation of the motor in response to temperature change and heat demand in the room, the combination with said motor and said room thermostat switch of thermostatic limit switch means responsive to temperature change in the heater chamber and effective at a plurality of predetermined temperature limits at which the switch means is automatically operable to open circuit position, and a manually operable, plural position selector switch which is electrically connected with said room thermostat switch, limit switch means, motor, and current source and is arranged in one setting of selector switch to connect the room thermostat switch and said limit switch means in series in said motor circuit to control the operation of the said motor thermostatically by means of said room thermostat switch and one lower temperature limit phase of said limit switch means jointly, and is arranged in another setting of said selector switch to shunt the room thermostat switch leaving only the limit switch means in series in the motor circuit to control the operation of the motor thermostatically by means of a higher temperature limit phase of said limit switch means alone.

3. A system as set forth in claim 1, including screw threaded adjustments individual to each of said sets of contacts for predetermining the temperature differential for functioning of the limit switch means.

4. A system as set forth in claim 2, wherein said limit switch means includes plural screw thread adjustments individual to the different temperature limits to be predetermined, whereby the critical temperatures in the heater chamber may be adjusted to higher or lower limits, as desired.

5. A system as set forth in claim 1, including screw threaded adjustments individual to each of said sets of contacts for predetermining the temperature differential for functioning of the limit switch means, said limit switch means including a manually adjustable element to step up or down the temperature range in which the limit switch means operates, without changing the differential determined by said screw threaded adjustments.

6. A system as set forth in claim 2, wherein said limit switch means includes plural screw thread adjustments individual to the different temperature limits to be predetermined, whereby the critical temperatures in the heater chamber may be adjusted to higher or lower limits, as desired, said limit switch means including a manually adjustable element to step up or down the temperature range in which the limit switch means functions, without altering the differential determined by said screw threaded adjustments.

7. In a heat regulator system comprising a heater having a chamber the temperature in which should not exceed a predetermined safety limit and an openable and closable draft control member, an electric motor connected through reduction gearing with the draft to open the draft when the motor is electrically energized, means to return the motor automatically to starting position when deenergized whereby to close the draft, and a room thermostat switch electrically connected with said motor and a source of electric current supply to control the operation of the motor in response to temperature change and heat demand in the room, the combination with said motor and said room thermostat switch of a thermostatically operable limit switch means including two sets of contacts, one operable thermostatically at a lower critical temperature than the other, the thermostat of which limit switch means is responsive to temperature change in the heater chamber, and a manually operable, plural position selector switch which is electrically connected with said room thermostat switch, limit switch means, motor, and current source and is arranged in one setting of said selector switch to connect the room thermostat switch and the lower temperature contacts of said limit switch means in series in said motor circuit to control the energization of said motor thermostatically by means of said room thermostat switch and limit switch means jointly, but is arranged in another setting of said selector switch to shunt the room thermostat switch leaving only the higher temperature contacts of said limit switch means in series in the motor circuit to control the operation of the motor thermostatically with said limit switch means alone.

8. In a heat regulator system comprising a heater having a chamber the temperature in which should not exceed a predetermined safety limit and an openable and closable draft control member, an electric motor connected through reduction gearing with the draft to open the draft when the motor is electrically energized, means to return the motor automatically to starting position when deenergized whereby to close the draft, and a room thermostat switch electrically connected with said motor and a source of electric current supply to control the operation of the motor in response to temperature change and heat demand in the room, the combination with said motor and said room thermostat switch of thermostatic limit switch means responsive to temperature change in the heater chamber and effective at a plurality of predetermined temperature limits at which the switch means is automatically operable to open circuit position, and a manually operable, plural position selector switch which is electrically connected with said room thermostat switch, limit switch means, motor, and current source and is arranged in one setting of selector switch to connect the room thermostat switch and said limit switch means in series in said motor circuit to control the energization of the said motor thermostatically by means of said room thermostat switch and one lower temperature limit phase of said limit switch means jointly, and is arranged in another setting of said selector switch to shunt the room thermostat switch leaving only the limit switch means in series in the motor circuit to control the operation of the motor thermostatically by means of a higher temperature limit phase of said limit switch means alone.

9. A system as set forth in claim 7, including screw threaded adjustments individual to each of said sets of contacts for predetermining the temperatures in the heater chamber at which the limit switch means will function automatically to control energization of said motor.

10. A system as set forth in claim 8, wherein said limit switch means includes plural screw thread adjustments individual to the different temperature limits to be predetermined, whereby the critical temperatures may be adjusted to higher or lower points, as desired.

11. In a heat regulator system comprising a heater having a chamber the temperature in which should not exceed a predetermined safety limit and an openable and closable draft control member, a reversible electric motor connected so as to open the draft and vice versa, and a room thermostat switch electrically connected with said motor and a source of electric current supply to control the operation of the motor in response to temperature change and heat demand in the room, the combination with said motor and said room thermostat switch of thermostatic double throw limit switch means responsive to temperature change in the heater chamber and effective at a plurality of predetermined temperature limits to operate the motor in one direction to close the draft at a "high" for a given temperature limit and vice versa at a "low" for a given temperature limit, and a manually operable plural position selector switch electrically connected with said room thermostat switch, and limit switch means, motor, and current source to control the operation of the said motor thermostatically by means of said room thermostat switch and one lower temperature limit phase of said limit switch means jointly in one setting of the manual switch and by means of a higher temperature limit phase of said limit switch means alone in another setting of the manual switch.

12. A system as set forth in claim 11, wherein said limit switch means includes plural screw thread adjustments individual to the different temperature limits to be predetermined, whereby the critical temperatures may be adjusted to higher or lower points, as desired.

JOHN F. COOK.

REFERENCES CITED

The following references are of record in the file of this patent:

UNITED STATES PATENTS

| Number | Name | Date |
|---|---|---|
| 926,391 | Dewey | June 29, 1909 |
| 1,835,307 | Johnson | Dec. 8, 1931 |
| 2,160,381 | Cruikshank | May 30, 1939 |
| 2,213,621 | Carlson | Sept. 3, 1940 |
| 2,243,753 | Gille | May 27, 1941 |
| 2,326,692 | Shipley | Aug. 10, 1943 |
| 2,363,748 | Robb | Nov. 28, 1944 |
| 2,383,533 | Crise | Aug. 28, 1945 |

Certificate of Correction

Patent No. 2,527,917                                                October 31, 1950

JOHN F. COOK

It is hereby certified that error appears in the printed specification of the above numbered patent requiring correction as follows:

Column 7, line 57, before the word "limit" insert *said*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*